Nov. 27, 1962 W. T. RENTSCHLER 3,065,682
PHOTOGRAPHIC CAMERA
Filed Sept. 25, 1959

INVENTOR
Waldemar T. Rentschler

BY
Munn, Liddy, Daniels & March
ATTORNEYS

United States Patent Office 3,065,682
Patented Nov. 27, 1962

3,065,682
PHOTOGRAPHIC CAMERA
Waldemar T. Rentschler, Calmbach (Enz), Germany, assignor to Alfred Gauthier, G.m.b.H., Calmbach (Enz), Germany, a corporation of Germany
Filed Sept. 25, 1959, Ser. No. 842,334
Claims priority, application Germany Sept. 26, 1958
12 Claims. (Cl. 95—10)

This invention relates to photographic cameras of the type having diaphragm and shutter speed setting members one of which is automatically adjusted in accordance with prevailing light conditions while at the same time taking into account a previous setting for film sensibility, such automatic setting of the one member occurring after the other setting member has been previously set.

Cameras of this general type have already been proposed and produced. Some of these prior cameras involved the use of costly components, especially sensitive or delicate structural elements, whereas other cameras of this type had different drawbacks involving their mode of operation and functioning.

An object of the present invention is to provide a novel and improved camera of the general type set forth above, which is especially arranged and organized in a most favorable manner, is characterized by relatively simple, inexpensive components and assemblages, and which is extremely simple to operate, both from the standpoint of the thought or mental activity required and also from the standpoint of the necessary physical operations.

The above advantages and features are achieved, in accordance with the invention, by the provision of diaphragm and speed setting members which are connected with each other by means of a differential gear means including an adjustable planet wheel carrier, the organization being such that the speed setting member can be pre-set within a range which is especially suited for the manual taking of pictures whereas, for the purpose of effecting an automatic setting of the diaphragm an adjustment of the planet wheel carrier is made while the speed setting member is held stationary in the said pre-set position. The adjustment of the planet wheel carrier is effected from a starting position and is determined by a mechanical stop which is controlled in response to the action of a light-intensity measuring device; also, the speed setting member is connected with the planet wheel carrier by another setting member (hereinafter also called a film sensibility setting member) which is releasably coupled to the speed setting member for disposition in different relative positions by a manually operable releasable coupling device. The said other or sensibility setting member is provided for the purpose of effecting adjustment for different film sensibilities, and a film sensibility indicator means comprising a scale and index mark therefor is associated with the said sensibility and speed setting members.

A camera constructed in accordance with the present invention has a number of important advantages. For one thing, it is characterized by a desirable simplicity and reliability with respect to its operation and method of functioning. This is because the connection or coupling between the speed and diaphragm setting members is effected in a well-tested mechanical manner, and after the presettings have been effected the exposure setting requires nothing more than merely shifting the planet wheel carrier from a specific starting position until a stop becomes operative and makes further motion impossible. The reliability of operation and simplicity, and the matter of insuring the taking of successful photographs at all times is enhanced by the specific arrangement provided, wherein only those speed settings are employed which are suited for taking photographs by hand. This will prevent the likelihood of pictures being taken which are spoiled because of movement of the camera by the operator, or because moving objects have been photographed, all without requiring calculation or other thought on the part of the operator. In addition to this, a camera as provided in accordance with the invention has an especially advantageous structure. The above-mentioned type of connection involving the differential gear means for coupling the speed and diaphragm setting members is not only reliable but inexpensive to produce and may be readily manufactured by mass production methods. It is also of special significance that the maximum extent of movement of the planet wheel carrier is fixed and always the same, regardless of different settings which are made to take into account different film sensibilities. This feature is of especial importance when the adjusting movement of the planet wheel carrier is effected in a fully automatic manner, since the fixed maximum extent of movement enables the use of an optimum, simple mechanical driving arrangement for the planet wheel carrier. In addition, the extent of movement of the planet wheel carrier for any exposure value may be substantially smaller (as for example only one half) than that of either the speed or diaphragm setting members, which is favorable where a fast setting motion is involved and also where a powered means is utilized to effect adjustment of the carrier. It is of further advantage to constitute the responsive or dependent exposure factor is the diaphragm setting member, since the diaphragm adjusting mechanism may be readily constructed in a simple and practical manner so as to require only a small force to effect its movement. In consequence, the adjustment of the planet wheel carrier may be done with relatively little force, which is of considerable importance. Finally, it is also advantageous that the member associated with the film sensibility setting device can remain stationary during the automatic setting operation of the camera, so that on the one hand the film sensibility setting will always be at the same place for all operating conditions of the camera, and on the other hand the members or masses which must be moved in effecting the automatic setting of the exposure value or diaphragm may represent a minimum quantity.

An especially high degree of operational simplicity and reliability in the taking of successful photographs is further provided by the invention, by the provision of an indicating or warning device which will apprise the user or operator of the suitability or acceptability of the diaphragm aperture which is obtained by a pre-setting of the shutter speed and film sensibility, for the existing or prevailing light conditions. The said indicating or warning device is preferably arranged to be visible in the viewer or range finder of the camera, and cooperates with a light-intensity measuring device; also the indicating or warning device is changeable or adjustable in its relative position or setting with respect to the light intensity measuring device in response to the adjusting movement of the film sensibility setting member when the latter is drivingly coupled with the speed setting member. The invention further provides an advantageous locking arrangement which permits the film sensibility setting to be changed only when the planet wheel carrier is in its starting position and the speed setting member is in a certain specific position, preferably the setting position which is associated with the shortest exposure time.

An important special advantage provided by the invention in a camera constructed in the above manner resides in the fact that the operator's only duty with respect to effecting a proper exposure setting is the supervision or observation of the indicating or warning device. Where the planet wheel carrier is arranged to have a fully automatic setting movement as above explained, the operator need do nothing more than pre-set the shutter speed in a manner such that the indicating device indicates a satisfactory or admissible exposure range; that is, the indicating or warning device should not give a warning that the range under consideration is not suitable for the existing light conditions and film sensibility. Where, as in the present instance, the settable shutter speeds are in a range which is exclusively suitable or suited for taking photographs by hand, the clarity and simplicity of the picture taking operation may be further enhanced by the omission of the shutter speed scale, since it is fully sufficient in order to obtain useful photographs that the indicating or warning device show the suitability of the pre-setting, with respect to the prevailing light conditions. Thus, the only setting scale which is then required is the film sensibility scale. This organization makes it especially easy to operate the camera. Moreover, the locking arrangement as provided by the invention insures that proper consideration is given by the indicating or warning device to each change, both of the shutter speed and film sensibility.

The indicating or warning device may be constructed in various ways. In the past cameras have been equipped with various types of indicating or warning devices, and devices for this purpose are known, per se. However, in accordance with the invention there is provided an especially simple and easily understood indicating device which is characterized by a reliable mode of operation, said device utilizing a light intensity measuring instrument such as the well known galvanometer movement having a meter or pointer which is visible in a window.

With the present indicating device two movable indicator members are provided which are also visible in the window or viewer, said members being cooperable with the needle or pointer of the galvanometer and the adjusting movement of the indicator members being adapted to the characteristic of the galvanometer by a control or transmission means employing, for example, suitable cams which are arranged between the indicator members and the film sensibility setting member. With such organization the indicator members outline or delineate a range which corresponds to the range of adjustment of the diaphragm of the camera, said indicator members indicating in each of their setting positions the diaphragm opening range to which the camera is limited by their settings.

In order to obtain optimum operational simplicity, the camera as provided by the present invention may be adapted to provide for fully automatic setting of the planet wheel carrier. This may be accomplished in an uncomplicated and functionally reliable manner by securing the planet wheel carrier in a starting position by means of a holding or detent device, and by driving the planet wheel carrier from said starting position under the action of a driving spring which preferably is tensioned in response to setting or cocking of the shutter, or actuation of the film transport mechanism of the camera. Further, the release of the detent means may be effected in response to actuation of the shutter release member.

The invention is described in detail by way of several embodiments which are diagrammatically illustrated in the accompanying drawings and explained in the following specification. Further advantages and features of the invention will also become apparent as the description proceeds.

Figures 1, 2, 3, 4:
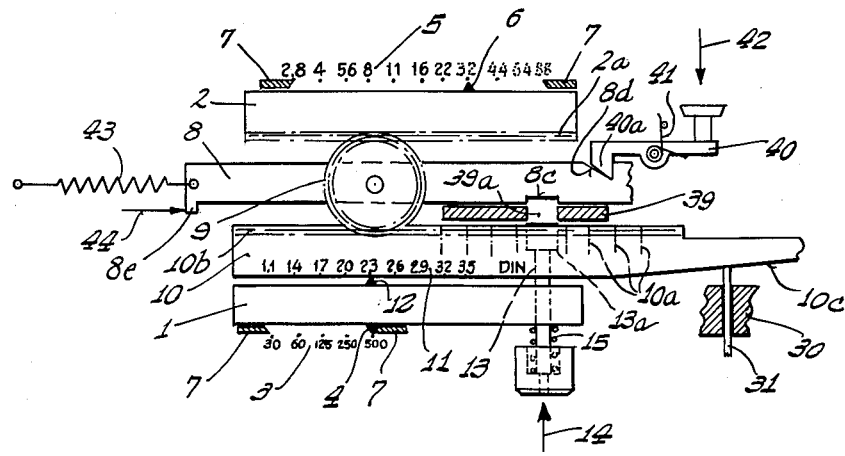
FIG. 1 is a diagrammatic illustration of a camera setting structure as provided by the invention, illustrating the various setting members involved. All such setting members are shown diagrammatically, and the positions of the parts or components are such that the camera is in readiness for the effecting of a fully automatic diaphragm setting.
FIG. 2 is a diagrammatic view of a portion of the planet wheel carrier and a cooperable mechanical stop which is controlled as to its position by a light-intensity measuring device.
FIG. 3 is a diagrammatic view of another portion of the setting mechanism as provided by the invention, illustrating the light-intensity measuring device and a transmission mechanism associated therewith together with two cooperable indicator members.
FIG. 4 is a fragmentary diagrammatic representation along the lines of FIG. 3 but illustrating a modification of the invention wherein the light-intensity measuring device is mounted for adjustable positioning and is set in various positions in response to actuation of the film sensibility and speed setting members.

Referring to FIG. 1, the shutter speed setting member of the camera is indicated by the numeral 1, and the diaphragm setting member is indicated at 2. Setting scales and marks serve to indicate the setting positions of these members, there being provided a speed setting scale 3 which is cooperable with an index mark 4 carried by the speed setting member 1. A diaphragm setting scale 5 is shown, being traversed by an index mark 6 which is carried by the diaphragm setting member 2. The extent of movement of the two setting members 1 and 2 is limited by stops 7. In accordance with the invention, the diaphragm setting range of the camera which is used, extends from the diaphragm value 2.8 to the diaphragm value 22; beyond the latter value, the diaphragm setting member 2 may be shifted a further extent, which however produces no change in the diaphragm opening. For this reason, the diaphragm scale values from 32 to 88 associated with the said additional path are indicated by dotted numbers. The size of the diaphragm opening within the said adjusting range of the setting member 2 from the values 32 to 88 may be kept constant in a well known manner, by an appropriate shaping of the diaphragm cam.

In accordance with the present invention, the two setting members 1 and 2 are connected or coupled with each other by means of a differential gear means comprising an adjustable carrier 8 on which a planet wheel 9 is carried, said wheel meshing with rack teeth as will be later explained. The shutter speed is pre-settable by means of the setting member 1, and the speeds available are preferably within a range which is suited for the taking of photographs by hand, as for example those shown on the scale 3. During the setting of the speed setting member 1, it is secured in its various adjusted positions by means of a well known detent device which is not shown in the drawing for the sake of clarity. In addition, for the purpose of effecting an automatic setting of the diaphragm, the planet wheel carrier 8 is adjustable or shiftable with the speed setting member 1 being held stationary, from a starting position as shown for example in FIG. 1 to various adjusted positions as effected by a mechanical stop which is controlled in response to the actuation of a light intensity measuring device. Also, the speed setting member 1 is connected with the planet wheel carrier 8 by means of an additional setting member 10 (which is herein referred to as a film sensibility setting member), said additional setting member being coupled with the speed setting member 1 by means of a releasable coupling whereby both the setting members may be secured to each other in different relative positions. For the purpose of setting the camera for different film sensibilities, a film sensibility scale 11 is arranged on the setting member 10 and an index mark 12 which is cooperable with the scale 11 is carried by the speed setting member 1.

The releasable coupling between the setting members 1 and 10 comprises a push pin 13 which is axially shiftable in the speed setting member 1; when the push pin 13 is depressed in the direction of the arrow 14 against the action of a spring 15 which tends to return it to the initial locking position shown in FIG. 1, the coupling between the setting members 1 and 10 is released as follows:

The coupling engagement between these two setting members is effected by a flange-like collar 13a on the end of the pin 13, said collar cooperating with detent recesses 10a provided in the setting member 10 and which are indicated in dot and dash outlines in FIG. 1. The detent gradation goes from 3° DIN to 3° DIN as shown in FIG. 1, but can also be made finer by correspondingly proportioning the end piece collar 13a and the detent recesses 10a, as for example, to enable the gradation to go from 1° DIN to 1° DIN.

The differential gear means serving to connect the speed setting member 1 and the diaphragm setting member 2 comprises in addition to the planet wheel 9 two sets of rack teeth 2a and 10b, which are provided respectively on the diaphragm setting member 2 and the film sensibility member 10 and which mesh with the planet wheel 9.

The light-intensity measuring device, by means of which there is adjustably positioned a mechanical stop for limiting the adjusting movement of the planet wheel carrier 8, may be constructed in any well known manner, and the same holds true for the structure and functioning of the said mechanical stop and its cooperation with the planet wheel carrier.

FIG. 2 diagrammatically shows the cooperation between the mechanical stop and the planet wheel carrier 8. In this figure a portion only of the planet wheel carrier is illustrated, such portion for example being that located to the right of the portion shown in FIG. 1. The planet wheel carrier 8 has a stepped or notched edge 8a which is adapted to cooperate with a pivotal lever 16, the latter being mounted on an axis 17 and feeling or scanning, preferably by means of a pressure release arrangement, the position of a moving control of the galvanometer which constitutes the light-intensity measuring device and which is connected to a photoelectric cell for energization therefrom.

The illustration of FIG. 2 further supposes that the planet wheel carrier 8 is in its starting position, corresponding to the position of the carrier as shown in FIG. 1. In order to insure, for this position of the planet wheel carrier, free movement of the galvanometer enabling it to respond in a sensitive manner to the existing light conditions, the feeler or scanning device of the galvanometer is held out of contact with the controlling or cam means of the galvanometer moving coil. This is illustrated in FIG. 2, where a camming edge 8b of the planet wheel carrier 8 is shown in engagement with a pin 18 carried by the lever 16, the said camming edge having effected a clockwise pivotal movement of the stop beyond the position thereof which is associated with the maximum light intensity.

The halting of the planet wheel carrier 8 during its movement from right to left as viewed in FIG. 1 and 2 is effected as follows: During the initial movement of the planet wheel carrier the camming edge 8b will move to the left as the carrier moves between the diaphragm values 32 and 22, to an extent such that it becomes disengaged from the pin 18 on the mechanical stop 16. Upon this occurring, the stop 16 becomes adjusted to a specific position as controlled by the response of the galvanometer to the existing light conditions and the position of the moving coil of said galvanometer. Depending on such position, the planet wheel carrier 8 will be halted by abutting engagement between the mechanical stop 16 and one of the steps on the stepped edge 8a of the carrier. For this purpose, the stop lever 16 has a bent end 16a, as clearly indicated in the drawing. The lowest step of the stepped edge 8a, as seen in FIG. 2, corresponds to the maximum value of light, and the highest step corresponds to the minimum value of light which can be indicated by the light-intensity measuring device. The correlation of these values with the steps of the curve or stepped edge 8a is always the same, irrespective of the position in which the film sensibility setting member 10 has been placed.

Regardless of how the light-intensity measuring device and the mechanical stop controlled thereby, which serves to limit the movement of the planet wheel carrier 8 are constructed, the extent of movement of the planet wheel carrier 8 as measured from its starting position will always correspond to a specific light intensity of the existing light conditions. By such organization and the above described differential gear connection between the diaphragm and speed setting members, in conjunction with the particular film sensibility setting as herein illustrated and provided in a camera constructed in accordance with the invention, there is had a simple and effective structure which is at all times reliable in its operation.

The above advantages are obtained regardless of the particular construction of the various setting members, said members being shown in the form of slides in the figures for the purpose of clarity of illustration. Instead of the setting members being constructed in this manner, they may have an annular or ring-like shape, whereby they are adapted to the structural conditions of well known cameras.

FIG. 3 illustrates in conjunction with FIGURE 1 how a camera may be produced in accordance with the invention, which is especially easy to operate and which insures the successful taking of photographs at all times. These objects are accomplished by the provision of an indicator and warning device which indicates, preferably in the viewer or range finder of the camera, whether the pre-setting of the speed and film sensibility members provides a diaphragm aperture value which is suitable for use with the prevailing light conditions or, to put it another way, whether the prevailing light conditions are such that good photographs will be had when the camera is pre-set in a particular manner by the operator. The said indicating device has relatively movable indicating members, the relative positions of which can be changed in response to the adjusting movement of the film sensibility member and which may be referred to the light intensity measuring device or a warning device which becomes operative. Further, a locking organization is provided which permits changing the film sensibility only when the planet wheel carrier 8 is in its starting position and the speed setting member 1 is in a specific adjusted position, preferably the setting position associated with the shortest exposure time as is illustrated in FIG. 1.

In the illustrated embodiments of the invention the light intensity measuring device is a galvanometer 19 of a type known per se, which is energized from a photoelectric cell 20. The photo-cell circuit also includes a balancing resistance 21. The needle 19a of the galvanometer may be seen in a viewer or sight window 22, which is preferably located in the view finder field or is mirrored into the view finder in a manner known per se.

The two indicator members of the indicator device are labelled 23 and 24 in FIG. 3, and these members are also visible in the viewing window 22 and are arranged to cooperate with the needle 19a, constituting with the same the above-mentioned indicating means. The indicating members 23, 24 are adapted, as to their adjusting motion, to the characteristic of the galvanometer 19 by means of a control and transmission means which is arranged between the said members and the film sensibility setting member 10. The indicator members 23 and 24 designate with each setting position the diaphragm opening range of the camera as it is limited by them. This range is designated "B" in FIG. 3.

The two indicating members 23, 24 are preferably constituted as needles or pointers, which are rotatably mounted and are coaxial with the needle 19a of the galvanometer. A control or transmission device is associated with each of the indicator members 23, 24 to effect adjusting movements of the said members in response to adjustment of the film sensibility setting member 10. Each of the said control or transmission devices comprises a cam and a follower portion of the indicator member, cooperating with the said cam. In the illustrated embodiment of FIG. 3, the cams have the reference characters 25 and 26, and are fixedly secured to a gear 27 to turn therewith. For cooperation with the cams 25, 26 the members 23, 24 have follower pins 23a, 24a respectively, and springs 28 and 29 are provided to bias the members 23 and 24 in a counterclockwise direction. The springs 28, 29 maintain the follower pins 23a, 24a continually in engagement with the said cams, and the latter are actuated in response to movement of a single cam 10c which is provided on the film sensibility setting member 10. The cam 10c is engaged by a cam follower or transmission pin 31 which is shiftable in a guide or bearing 30, the said pin also engaging a bell crank or angle-shaped lever 33 which is pivotal about an axis 32. The movements of the bell crank 33 are transmitted, by means of a second pin 35 shiftable in a bearing 34, to a gear 36 which meshes with the gear 27. A spring 38 arranged about the axis 37 of the gear 36 provides a counterclockwise bias to the gear 36 and insures a tensional or continual connection between the cam 10c and the gear 27.

The cams 25, 26 are so constituted that for example the indicator member 24 has the same adjusting characteristics as the needle 19a in response to the exposure value gradations, and that with each setting position of the indicator member 24 the member 23 is spaced from the member 24 a distance which corresponds to the same number of exposure value steps to be indicated by the needle 19a as there are exposure value steps in the operative diaphragm adjustment range of the camera extending from the values 2.8 to 22.

That is, the spacing of the members 23 and 24 for any setting position thereof is equivalent to a range of exposure values involving the diaphragm apertures from 2.8 to 22, which range provides satisfactory pictures for any position of the needle 19a within the range. In other words, the distance between the two pointers covers a range of diaphragm values which is suitable for the taking of pictures for existing light conditions when the pointer 19a of the light meter or measuring device indicates anywhere in this range for a given setting of the members 1 and 10.

The previously mentioned locking arrangement which is associated with the film sensibility setting member 10 is constructed as follows, in the illustrated embodiment of the invention;

A stationary locking rail 39 is provided, extending along the path of movement of the film sensibility setting member 10. The rail 39 acts in a manner to prevent the releasable coupling pin 13 from being shifted to its releasing position (as indicated by the direction of the arrow 14) to effect release of the coupling between the speed setting member 1 and the film sensibility setting member 10 whenever the planet wheel carrier 8 and the setting member 10 are not in the positions which they occupy in FIG. 1. This control of the coupling pin 13 results from the fact that the rail 39 provides an obstruction for the collar 13a of the pin 13, preventing the said collar from being shifted out of engagement with one of the detent recesses 10a provided in the film sensibility member 10. While a certain limited movement of the release pin 13 is possible, such movement is not sufficient (as it is limited by the locking rail 39) to enable a disconnection to be established between the setting members 1 and 10. Additionally, both the planet wheel carrier 8 and the locking rail 39 have openings or recesses 8c and 39a respectively, which may be aligned with each other when these components are in the positions shown in FIG. 1, so that the coupling pin 13 which is carried by the speed setting member 1 may be shifted into the said aligned openings or recesses in order to effect release of the coupling between the members 1 and 10.

The selected position for which the coupling may be released is, in the illustrated embodiment of the invention, that setting position of the speed setting member 1 which is associated with the shortest exposure time. This setting position on the one hand is found to be advantageous with respect to the film sensibility and, on the other hand is of advantage especially since a setting at the shortest exposure time as a base position offers the greatest guarantee for taking sharp pictures of moving objects which are unspoiled by moving the camera.

With the above described and illustrated locking arrangement each change with respect to a pre-setting of a speed and film sensibility, once it has been effected, is transmitted to the indicating members 23, 24 so that the latter indicate the relative position of the admissible or satisfactory diaphragm setting range with respect to the indicated light intensity value, taking into account all exposure factors which are different from the diaphragm.

If the speed setting is limited to the range of speeds suited for taking photographs by hand, the invention permits, in principle, dispensing not only with the arrangement of a diaphragm scale but also with the arrangement of an exposure time or speed scale. This is due to the fact that the shutter speeds located within the said range always insure useful pictures, so that the only point or factor which matters is that the preset diaphragm opening value, taking into account prevailing light conditions, is within the operating range of the camera. The operator therefore need not have the slightest knowledge about the connections between the speed and diaphragm setting members or mechanisms. It is sufficient that he be instructed to observe, prior to taking a photograph, the setting member 1 and to set the latter in such a manner that the needle 19a is somewhere within the range indicated by indicator members 23, 24.

In order clearly to emphasize the correlation of the direction of adjusting movement of the setting member 1 with directions of movement of the indicator members 23, 24 these latter may be distinguished by a distinctive shape, or else by color.

Also, instead of or in addition to such distinction between the two indicator members, colored fields may be associated with the said members to strikingly indicate the fact the light intensity is too low or too high, or else that it properly corresponds to the said operating range of the camera. Such colored fields may be so constituted that a bright yellow field is connected to and arranged to follow the indicator member 24 on the right, whereas a black field may be connected to and may follow the indicator member 23 on the left. These fields are indicated in FIG. 3 by the numerals 24a and 23a respectively. The range between the said indicator members may also be indicated by a green colored field, and such field may be produced by providing concentric segments 23b and 24b respectively on the indicator members 23, 24. The range between the said indicator members may also be indicated by a green colored field, and such field may be produced by providing concentric segments 23b and 24b respectively on the indicator members 23, 24. Such organization would make it clearly evident that the light intensity is too high with respect to the pre-set operating range of the camera if the needle 19a is indicating in the yellow field, whereas the light intensity would be too low when the needle is indicating in the black field. If the needle is disposed between the members 23 and 24, that is, in the green field this would indicate that the pre-set indicating range corresponds to the prevailing light conditions or vice versa, i.e., that the photograph can be taken at the pre-set position of the setting member 1.

Instead of constructing the indicating device in the manner shown herein, it may also be arranged as illustrated in FIG. 4, wherein the galvanometer 19 is provided with an adjustable mounting and is rotatable in a manner known per se about an axis which is aligned with the axis of the needle. With such organization one of the indicator members would be stationary and the remaining member would be movable, said members being cooperable with the galvanometer needle in a manner similar to that already described above. A control means or cam would be provided between the rotatably mounted galvanometer and the film sensibility setting member 10, similar to the cam arrangement provided in connection with the indicator member 23 for example. Such cam arrangement would provide for the adjusting movement of the galvanometer and of the movable mark or indicating member being adapted to the characteristic of the galvanometer, so that for each setting position of the galvanometer and the movable indicator member the latter and the stationary indicator member will define the diaphragm opening range of the camera, this being indicated by the range or space existing between the two indicator members. An indicating and warning device constructed in this manner will have the advantages of the device illustrated in FIG. 3. Referring to FIG. 4, the stationary indicator member is designated by the character 23f, and the cooperable movable indicator member is shown at 24f. The turnably mounted galvanometer is indicated at 19f, said galvanometer being fixedly connected with a cam follower arm 19g having a follower pin 19h which is engageable with the cam 26. The embodiment of the invention illustrated in FIG. 4 has the additional advantage that the viewing window of the device can be smaller than that required for the embodiment of FIG. 3, since the width of the window need be only a little more than the maximum distance between the stationary member 23f and the movable indicator member 24f. Such organization facilitates the showing of the indications in the camera viewer or range finder. However, it involves a more costly construction in arranging for the rotatable mounting of the galvanometer. As shown in FIG. 4, the adjustable turning of the galvanometer may be effected by the cam 26 in a manner similar to actuation of the indicator member 23 by the said cam.

The advantages provided by the invention are of optimum effect in connection with fully automatic exposure settings. FIG. 1 shows or suggests a particularly suitable embodiment. The planet wheel carrier 8 is secured in its starting position by a holding or detent device, and the shifting of the carrier from this position takes place under the action of a driving spring which is preferably tightened or cocked in response to setting of the shutter or else shifting of the film in the camera. The release of the said detent device is effected in response to actuation of the release member for the camera shutter.

The said holding device comprises, as illustrated in FIG. 1, a pawl or catch 40 having a pointed projection 40a adapted to be received in a correspondingly shaped recess 8d of the planet wheel carrier 8. The pawl 40 is operable against the action of a spring 41 and is turned in a clockwise direction in response to actuation of the release of the camera. The connection of the pawl 40 with the camera release is indicated schematically by the arrow 42, and such connection may utilize any suitable form of transmission device well known in the mechanical arts.

The source of driving power for the planet wheel carrier is a coil spring 43 which is connected between the planet wheel carrier and a fixed point. The tensioning of the spring 43, i.e. the advancing of the planet wheel carrier from left to right in returning to the position shown in FIG. 1, is accomplished in response to the setting or cocking of the camera shutter or else in response to advance of the film in the camera. The coupling or connection by which this is effected is schematically indicated by the arrow 44 in FIG. 1, and such connection may involve a stop or lug 8e provided on the planet wheel carrier 8. For the sake of clarity, such connection between the planet wheel carrier and the actuating member for cocking the shutter or else the actuating member for advancing the film is not illustrated in the drawings since transmission and actuating devices suitable for this purpose are well know per se.

The mode of operation and functioning of the camera of the present invention, as illustrated in the embodiments and utilizing a fully automatic exposure setting is, briefly, as follows:

(1) *Film sensibility setting.*—This is carried out with the setting members occupying the positions illustrated in FIG. 1. In effecting a setting for different film sensibilities the coupling connection between the members 1 and 10 is released by depressing the push pin 13 in the direction of the arrow 14 and the sensibility setting member 10 is adjusted with respect to the exposure time or speed setting member 1. During such adjustment, the diaphragm setting member 2 is simultaneously adjusted by means of the differential gear 10b, 9, 2a; this also causes, by virtue of the cam 10c and transmission device connected thereto, an adjustment of the indicator members 23, 24 whereby these members occupy specific setting positions.

(2) *Activity of the operator prior to taking the photograph.*—Such activity is limited to checking or observing whether or not the needle 19a of the galvanometer 19 is within the range bounded by the indicator members 23, 24.

If the needle 19a is not within the said range, the operator will be required to adjust the setting member 1 in such a manner that the needle is brought into the said range bounded by the two indicator members. When the speed setting member 1 is being shifted or adjusted to effect this, the film sensibility setting member 10 also shifts by virtue of the coupling connection 13, 10a which now also produces a change in the position of the indicator members 23, 24.

If the adjustment of the speed setting member 1 within its range as limited by the stops 7 does not bring the needle 19a into the indicated range between the two indicating members 23, 24 this signifies that the light intensity is either too high or too low to enable photographs to be taken with an automatic exposure setting at the desired film sensibility.

(3) *Carrying out an exposure.*—This is done by actuating the camera release (not shown in the drawings) which is coupled or connected with the detent lever 40. In response to actuating such camera or shutter release, the detent pawl 40 is turned clockwise or released, whereby the planet wheel carrier 8 is freed for right-to-left movement under the action of the spring 43. Depending on the intensity of the prevailing light conditions, the planet wheel carrier 8 will be stopped in a specific position after a shorter or longer path of movement, by engagement of one of the steps of the stepped edge 8a with the mechanical stop lever 16. This causes the diaphragm setting member 2 to automatically occupy a setting position corresponding to the prevailing light intensity, as well as to the pre-set shutter speed and film sensibility factors.

In accordance with the present invention there is provided a camera having an automatic exposure setting, which combines an extremely simple and reliable structure with a high degree of operational simplicity, wherein the operation may be readily understood even by persons having no technical knowledge. This advantage is had in all types of cameras constructed in accordance with the invention, whether or not these have semi-automatic or fully automatic adjustment of the planet wheel carrier 8.

The advantages provided by the invention are especially evident in the case of a fully automatic setting, when such a camera is compared with well known or proposed cameras of the same species. For example, considering a camera with a so-called diaphragm-follow control ("run-after") the camera of the present invention may be more economically produced and does not require structural elements or components involving a sensitive response which may result in unreliability, as well as the need for special voltage sources, etc. Yet the results are the same, when the cameras are in perfect working condition. Moreover, a camera as provided by the invention in conjunction with the indicating and warning mechanism as described herein has the special advantage that it is possible to recognize immediately upon aiming the camera at the subject to be photographed, whether or not the pre-setting of the exposure time will provide a diaphragm opening which falls within the permissible operating range of the camera, considering the existing light conditions.

The above-mentioned indicating and warning mechanism has the additional advantage that a camera which is provided with the same makes it easier for the operator of the camera to take good photographs regardless of whether or not such operator has any knowledge of the photographic art, or has no knowledge whatsoever thereof. This is due to the fact that the taking of useful pictures requires nothing more than paying attention to the indicating or warning device which indicates the admissibility or satisfactory quality of the pre-settings which have been effected for the prevailing light intensities. On the other hand, the above described type of indication makes it possible to take optimum photographs because the operator may adjust the shutter speed so that either the shortness of the exposure time or else the magnitude of the depth of focus is given precedence. This is accomplished by effecting an adjustment of the speed setting member 1 while the camera is pointed at the subject and the regulator is operative, so as to locate one or the other of the indicator members 23, 24 in coincidence with the galvanometer needle 19a.

A camera having the above-mentioned features as provided by the invention is characterized by a high degree of operational simplicity while at the same time it has a wide, generously utilizable range or application.

I claim:

1. In a photographic camera, in combination, diaphragm and speed setting members; a coupling differential gear means which couples said members, said means including a movable planet wheel carrier having a cocked starting position and having setting positions differing from and translationally shifted with respect to said starting position and a planet wheel turnably mounted thereon, and including gear teeth engaged by the planet wheel and connected to said members; means including a mechanical stop settable in different positions in accordance with existing light conditions, for halting the planet wheel carrier in a predetermined position when the carrier is shifted from said starting position, thereby to effect adjustment of the diaphragm setting member with the speed setting member stationary, said coupling differential gear means further including a film sensibility setting member adjustably movable and settable with respect to the speed setting member, and including a releasable coupling device between said sensibility and speed setting members; and film sensibility indicator means comprising a scale and index mark therefor, associated with said sensibility and speed setting members.

2. The invention as defined in claim 1, in which there is a light-measuring device, in which there is a movable index means controlled by said light-measuring device and variously positioned in response to the said existing light conditions, in which there is an indicating device cooperable with the said index means and movable with respect thereto in response to adjusting movement of the said sensibility and speed setting members when these are coupled by the releasable coupling device, and in which there are locking means enabling release of the said coupling means to be effected when the said carrier is in its starting position and the speed setting member is at one specified position, said locking means holding the coupling means against release during the said setting positions of the carrier.

3. The invention as defined in claim 2, in which the light-measuring device comprises a galvanometer, in which the index means comprises a needle of said galvanometer, in which there is a viewing window through which the needle may be seen, in which the indicating device may be viewed through the window and comprises two movable indicator members cooperable with said needle, and in which there is a transmission means which takes into account the characteristic of the galvanometer, effecting a variable spacing between and movement of the indicator members in response to movement of the said sensibility setting member whereby the range denoted by the positions and spacing of the indicator members when coordinated with the said needle denotes a setting of the diaphragm which is satisfactory for the taking of a picture.

4. The invention as defined in claim 2, in which the light-measuring device comprises a galvanometer mechanism mounted for adjustable turning movement, in which there is an adjusting device for adjustably positioning the galvanometer mechanism, in which the index means comprises a needle of said galvanometer mechanism, in which there is a viewing window through which the needle may be seen, in which the indicating device may be viewed through the window and comprises a stationary indicator member and a movable indicator mechanism both cooperable with said needle, and in which there is a transmission means which takes into account the characteristic of the galvanometer, effecting relatively variable adjusting movements of the galvanometer and indicator mechanisms in response to movement of the said sensibility setting member whereby the range denoted by the spacing between and relative positions of the indicator member and mechanism when coordinated with the said needle denotes a setting of the diaphragm which is satisfactory for the taking of a picture.

5. The invention as defined in claim 3, in which the transmission means includes a single cam disposed on the said sensibility setting member, and includes control devices respectively associated with the said indicator members.

6. The invention as defined in claim 3, in which the indicator members are differently shaped to distinguish them from each other.

7. The invention as defined in claim 3, in which colored fields are carried respectively by the indicator members, extending between the members and also beyond the remote sides of the members to suggest by color the acceptable or unacceptable nature of the light conditions with respect to the relative positions of the members and needle.

8. The invention as defined in claim 3, in which the mechanical stop is controlled by the said light-measuring device.

9. The invention as defined in claim 2, in which the locking means comprises a stationary locking rail and a locking member cooperable with said rail and carried by the releasable coupling device, in which the planet wheel carrier and locking rail have recesses which are aligned with each other when the carrier is in the said starting position and the film sensibility and speed setting members are in a specific position, said locking member being receivable in the said aligned recesses to enable release of the said coupling.

10. The invention as defined in claim 1, in which there is a detent for releasably holding the carrier in its starting position, in which there is a driving spring for shifting the carrier in a direction away from said starting position, and in which there are means for releasing said detent in response to actuation of the shutter release.

11. The invention as defined in claim 4, in which the transmission means includes a single cam disposed on the said sensibility setting member, and includes control devices respectively associated with the galvanometer and indicator mechanisms.

12. The invention as defined in claim 3, in which the indicator members are differently colored to distinguish them from each other.

References Cited in the file of this patent

UNITED STATES PATENTS

| | | |
|---|---|---|
| 2,250,898 | Tonnies | July 29, 1941 |
| 2,418,370 | Simmon | Apr. 1, 1947 |
| 2,879,702 | Gossen | Mar. 31, 1959 |
| 2,913,969 | Faulhaber | Nov. 29, 1959 |
| 2,923,216 | Greger | Feb. 2, 1960 |